United States Patent
Schachter et al.

(10) Patent No.: US 9,544,562 B2
(45) Date of Patent: Jan. 10, 2017

(54) CONVERTING AN IMAGE FROM A DUAL-BAND SENSOR TO A VISIBLE COLOR IMAGE

(71) Applicants: Bruce J. Schachter, Clarksville, MD (US); Peter J. Vanmaasdam, Baltimore, MD (US); Jack Gordon Riddle, Columbia, MD (US)

(72) Inventors: Bruce J. Schachter, Clarksville, MD (US); Peter J. Vanmaasdam, Baltimore, MD (US); Jack Gordon Riddle, Columbia, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 389 days.

(21) Appl. No.: 14/056,306

(22) Filed: Oct. 17, 2013

(65) Prior Publication Data
US 2015/0288941 A1 Oct. 8, 2015

(51) Int. Cl.
*H04N 9/77* (2006.01)
*G06T 5/50* (2006.01)
*H04N 5/33* (2006.01)

(52) U.S. Cl.
CPC ........ *H04N 9/77* (2013.01); *G06T 5/50* (2013.01); *H04N 5/33* (2013.01); *G06T 2207/10024* (2013.01); *G06T 2207/10048* (2013.01); *G06T 2207/20221* (2013.01)

(58) Field of Classification Search
CPC ............... H04N 9/77; H04N 5/33; G06T 5/50
USPC ....................................................... 348/164
See application file for complete search history.

(56) References Cited

U.S. PATENT DOCUMENTS

| | | | | |
|---|---|---|---|---|
| 5,414,529 | A | * 5/1995 | Terada | H04N 1/6016 345/600 |
| 2006/0006331 | A1 | 1/2006 | Adamietz et al. | |
| 2010/0069758 | A1 | * 3/2010 | Barnes | A61B 5/0059 600/473 |
| 2011/0147004 | A1 | * 6/2011 | Neelamani | G01V 1/36 166/369 |
| 2014/0119651 | A1 | * 5/2014 | Meyers | G06T 5/50 382/167 |
| 2014/0335036 | A1 | * 11/2014 | Marsh | A61K 8/4946 424/62 |

OTHER PUBLICATIONS

Liu et al., "Comparisons of Several Pixel-Level Image Fusion Schemes for Infrared and Visible Light Images", Instrumentation and Measurement Technology of the Conference 2005, IMTC 2005, Proceedings of the IEEE Ottawa, ON, Canada May 16-19, 2005, Piscataway, NJ, USA, IEEE, vol. 3, May 16, 2005, pp. 2024-2027.

(Continued)

*Primary Examiner* — William C Vaughn, Jr.
*Assistant Examiner* — Jae N Noh
(74) *Attorney, Agent, or Firm* — Tarolli, Sundheim, Covell & Tummino LLP

(57) ABSTRACT

One embodiment describes a method for converting a dual-band image to a visible color image. The method includes converting the dual-band image to data in a placeholder image in a placeholder color space. The placeholder color space employs a wavelet-based image fusion technique while mimicking the oppositional color processing technique of the human visual system. The placeholder image is further mapped into visible color space, generating the visible color image.

20 Claims, 7 Drawing Sheets

(56) References Cited

OTHER PUBLICATIONS

Li et al., "Multisensor Image Fusion Using the Wavelet Transform", CVGIP Graphical Models and Image Processing, Academic Press, Duluth, MA, US, vol. 57, No. 3, May 1995, pp. 235-245.
Pajares et al., "A Wavelet-Based Image Fusion Tutorial", Pattern Recognition, Elsevier, GB, vol. 37, No. 9, Sep. 2004, pp. 1855-1872.
Sun et al., "Novel Method on Dual-Band Infrared Image fusion for Dim Small Target Detection", Optical Engineering, vol. 46, No. 11, Nov. 2007, pp. 116402:1-116402:8.
Tsagaris et al., "Fusion of Visible and Infrared Imagery for Night Color Vision", Displays, Devices, DEMPA Publications, Tokyo, JP, vol. 26, No. 4-5, Oct. 2005, pp. 191-196.
PCT International Search Report for PCT/US2014/059469, mailed Feb. 20, 2015, pp. 1-12.

\* cited by examiner

CONVERTING AN IMAGE FROM A DUAL-BAND SENSOR TO A VISIBLE COLOR IMAGE

This invention was made with Government support under Contract No. W909MY-06-C-0060. The Government has certain rights in this invention.

TECHNICAL FIELD

The present invention relates generally to converting an image from a dual-band sensor to a visible color image based on wavelet-based image fusion and a characteristic of the human visual system.

BACKGROUND

A dual-band Forward Looking Infrared (FLIR) camera employs two different sets of sensing elements to detect infrared radiation. The two types of sensors include a long-wave infrared (LW or LWIR, wavelength 8-12 μm) sensor and a mid-wave infrared (MW or MWIR, wavelength 3-5 μm) sensor. LW images from data generated by the LW sensor are based on emitted energy, while the MW images from data generated by the MW sensor are based on emitted energy plus reflected energy, where reflected energy is prevalent in the daytime. Similar but slightly different monochrome images (the LW image and the MW image) can be constructed from data generated by each of the sensors. However, human viewers may have difficulty combining the two images in their minds to create a combined representation of the two monochrome images that accounts for different phenomenological features that may be embedded within the two bands.

The LW image and the MW image can be combined into a single image with each pixel having a vector of size two (represented as {LW, MW}). A human can perceive phenomenological features in the combined image mapped to two channels of a color display better than in two separate grayscale images. Even more of the phenomenology is perceivable when features of the combined image are displayed in full visual color, using all three channels (e.g., red channel, green channel, and blue channel) of a color display. Typically, the human visual system can directly perceive images within the visible spectrum, which includes three partially overlapping bands: the red band (R), the green band (G) and the blue band (B), such that each pixel of a visible image is a vector of length three {R, G, B}.

SUMMARY

One embodiment includes an apparatus associated with a processor that facilitates the execution of machine readable instructions to convert an image from a dual-band sensor to a visible color image. The machine readable instructions can facilitate conversion of the image from the dual-band image sensor to a placeholder image in a placeholder color space. The placeholder color space is established based on wavelet-based image fusion and an oppositional color processing technique used by the human visual system. The machine readable instructions can also facilitate mapping the placeholder image to a visible color space to create the visible color image.

Another embodiment includes a non-transitory computer-readable storage medium storing instructions executable by an associated processor to perform a method for converting an image from a dual-band sensor to a visible color image. The method includes converting the image from the dual-band sensor to a placeholder image in a placeholder color space. The placeholder color space is established based on wavelet-based image fusion and an oppositional color processing technique used by the human visual system to perceive colors. An aspect of the converting includes reducing redundancy between a first component of the image from the dual-band sensor from a first channel and a second component of the image from the dual-band sensor from a second channel. The method also includes mapping the placeholder image into a visible color space to create the visible color image.

A further embodiment includes a non-transitory computer-readable device storing executable instructions executable by an associated processor to perform operations that convert a dual-band image to a visible color image. The operations include reducing noise in the dual-band image and standardizing a dynamic range between a first component of the image from the dual-band sensor from a first channel and a dynamic range of a second component of the image from the dual-band sensor from a second channel. The operations also include converting the dual-band image with reduced noise and standardized dynamic range to a placeholder image within a placeholder color space that is established based on wavelet-based image fusion and an oppositional color processing technique used by the human visual system. The operations further include transforming the placeholder to a visible color space to create the visible color image.

DETAILED DESCRIPTION

The present invention relates generally to converting a dual-band image from a dual-band sensor to a three-band visible color image. As used in this application, the term "image" generally refers to image data that can be displayed by a display device. As used in this application, the term "visible color image" refers to an image with a red value, a green value and a blue value at each pixel, where each value is within the dynamic range of a standard display (e.g., 8-bits/pixel per color).

The conversion of the dual-band image to the visible color image can be accomplished via a process that tightly merges wavelet-based image fusion with strategies inspired by the operation of the human visual system. The dual-band image is first converted to a placeholder image in a simplified placeholder {L*, a*, b*} color space. The term "placeholder," as used in this application, generally refers to an intermediate product and is a synonym for intermediate, temporary, notational, preliminary, and other similar terms. The placeholder {L*, a*, b*} color space, as well at the corresponding placeholder {L*, a*, b*} image, is generally formed at least in part via floating point arithmetic. The L* component of the placeholder {L*, a*, b*} color space is generated by fusing images from the bands of the dual-band image using a wavelet-based approach. The a* component of the placeholder {L*, a*, b*} color space and the b* component of the placeholder {L*, a*, b*} color space are generated according to strategies inspired by the human visual system. The placeholder image is mapped to visible {R, G, B} color space to create the visible color image. The visible color image can be displayed by a display device for visual analysis by a human or the data can be exploited by an automated process that uses artificial intelligence.

Figure 1:
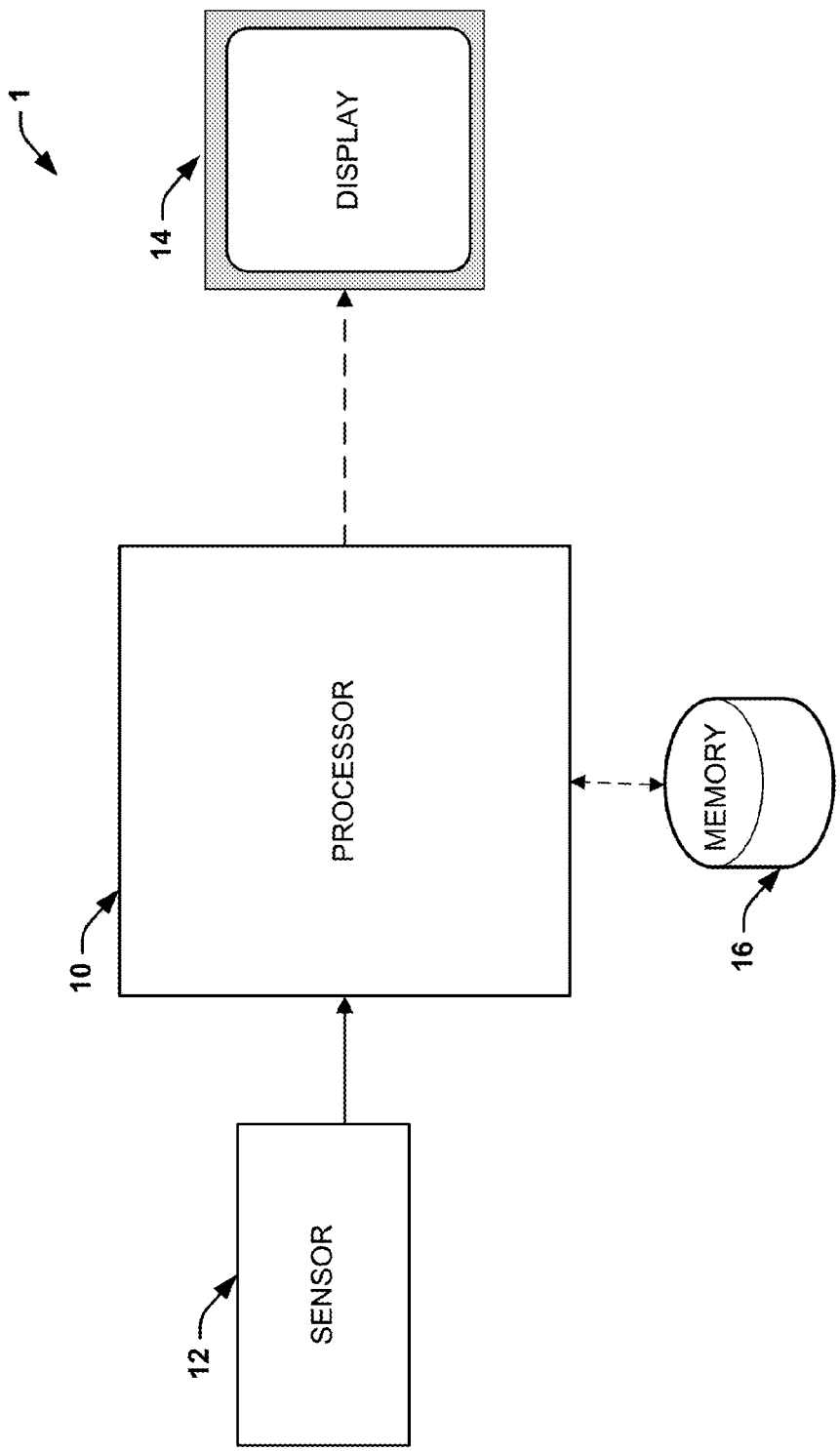
FIG. 1 illustrates an example of a system that converts a dual-band image to a visible color image.

Referring now to FIG. 1, illustrated is an example of a system 1 that converts a dual-band image to a visible color image according to a process that tightly merges a wavelet-based image fusion technique with strategies inspired by the human visual system. System 1 includes at least a sensor 12 (sensor 12 is also referred to herein as "the dual-band sensor 12" or "the dual-band camera 12;" the terms "sensor" and "camera" are used interchangeably herein) and a processor 10. The processor 10 receives a dual-band image from dual-band sensor 12 and converts the dual-band image to a placeholder image in a placeholder {L*, a*, b*} color space with an L* component, an a* component and a b* component. The processor 10 forms the L* component by fusing images in the two bands of the dual-band image using a wavelet-based approach. The processor 10 employs strategies inspired by the human visual system to form the a* component and the b* component. The processor 10 maps the placeholder image in the placeholder {L*, a*, b*} color space to visible {R, G, B} color space to generate the visible color image.

The dual-band sensor can refer to a sensor that can collect data in at least two bands of the electromagnetic spectrum to form a dual-band image and/or two separate sensors that each produces a different band of the image. Examples of sensors that can be used to generate one or both bands of the dual-band sensor 12 include a long-wave forward-looking infrared (FLIR) sensor, a mid-wave FLIR sensor, fully integrated dual-band long-wave/mid-wave FUR sensor, a short wave infrared sensor, a monochrome visible sensor, a near infrared sensor, an image intensified image sensor, or any other type of dual-band sensor or combination of two sensors imaging in different bands. Post-processing stage(s) of the dual-band image that can facilitate conversion to the visible color image can be performed by a processor within the sensor 12 and/or within a processor 10 that is external to the sensor 12. Example post-processing stages include non-uniformity correction, bad pixel correction, and the like.

The processor 10 is communicatively coupled to the sensor 12 according to a means of communication that enables transfer of image data. The processor 10 can be located in a position that facilitates communication with the sensor 12. For example, the processor 10 can be housed within the same assembly as the sensor 12, housed within a processor box adjacent to the sensor 12, housed within a processor box separate from the sensor 12, or associated with a display controller, graphical user interface, or the like. The processor 10 can include, for example, a real-time processor, a signal processor, a single-board computer, or any other type of processor that can facilitate execution of instructions for converting the dual-band image represented by the data to the visible color image.

The processor 10 can utilize different types of hardware and/or software filters throughout the conversion (e.g., applied to one or more of the dual-band image, the placeholder image, or the visible color image) to control the sharpness and/or the noise characteristics of the visible color image. Examples of filters include a mean filter, a median filter, a low-pass filter, a high-pass filter, an unsharp mask filter, and the like. Moreover, the processor 10 can further map the visible color image to a different color space (e.g., to emphasize a feature of the visible color image).

System 1 optionally can include a memory 16 and/or a display 14. The memory 16 can be communicatively coupled to the processor 10 and can store executable instructions that can facilitate the conversion of the dual-band image from the sensor 12 to the visible color image 12 by processor 10. The display 14 can be communicatively coupled to the processor 10 to display the visible color image (e.g., to a human user). The data that is generated for display 14 can also be further processed according to an artificial intelligence routine. The display 14 can include a computer monitor, a video display, or any other type of monitor that can display a visible color image or a motion picture of the visible color image. The visible color image can be a still image, a motion picture, or any combination of a still image and a motion picture.

Figure 2:
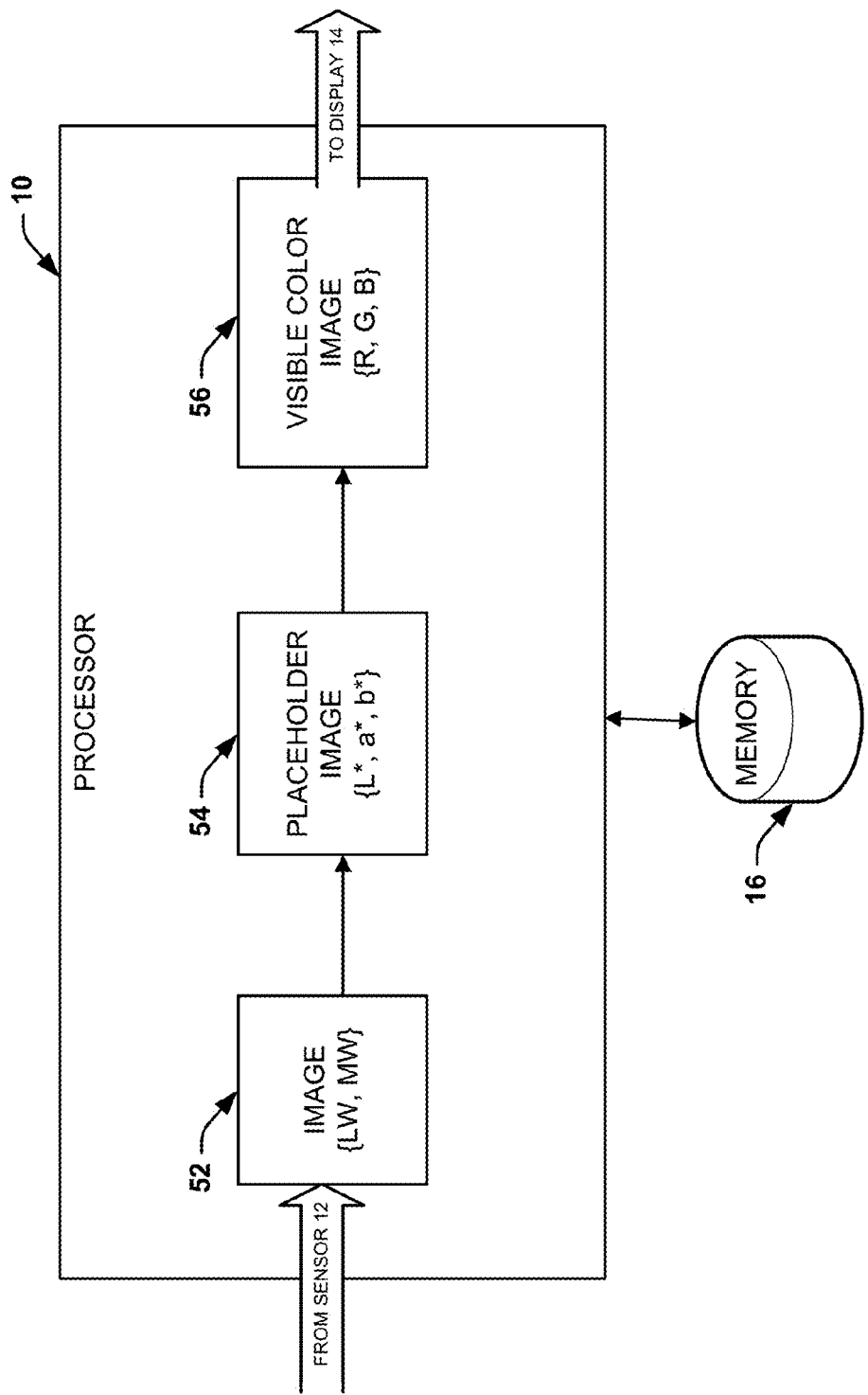
FIG. 2 illustrates an example of a conversion of an image from a dual-band forward-looking infrared (FLIR) sensor to a visible color image.

An example of the functionality of processor 10 when the dual-band sensor 12 is a FLIR sensor is illustrated in FIG. 2. Processor 10 receives a dual-band image 52 from the FLIR sensor 12. The dual-band image 52 includes pixels that are two-dimensional vectors of long-wave data (LW) and mid-wave data (MW), represented as {LW, MW}, where LW and MW are assumed to each contain one integer value per pixel. The FLIR sensor 12 captures image data within the LW band and the MW band, virtually simultaneously. It is assumed that the dual-band image 12 has been spatially registered (e.g., by sensor design, processing, etc.) on a pixel-by-pixel basis prior to processing by the processor 10. The processor 10 converts the dual-band {LW, MW} image to a placeholder image 54. The placeholder image can be represented as a vector of size three, {L*, a*, b*}. The conversion of the dual-band image 52 to the placeholder image 54 can be accomplished via floating point arithmetic employing a technique that merges wavelet-based image fusion with oppositional color processing techniques used by the human visual system.

The placeholder image 54 is within a placeholder {L*, a*, b*} color space that includes an L* component, an a* component and a b* component. The processor 10 generates the L* component according to a wavelet-based image fusion approach that fuses the LW component of the dual-band image and the MW component of the dual-band image. The processor 10 generates the a* component and the b* component according to oppositional color processing strategies inspired by the human visual system according to the LW component of the dual-band image, the MW component of the dual-band image, and a function of the LW component of the dual-band image and the MW component of the dual-band image.

The processor 10 generates the visible color image 56 from the placeholder image 54. As an example, the processor 10 can map the placeholder image 54 in the placeholder {L*, a*, b*} space to the visible color image 56 within the red band, the green band and the blue band, which is denoted as a vector of size three, {R, G, B}. The visible color image 56 can be displayed by a display device (e.g., the display device 14, such as a computer monitor) so that features can be detected by human perception. The data related to the visible color image 56 (e.g., in floating point or fixed point form) can be further processed according to an artificial intelligence routine. The visible color image 56 can be provided in integer format, one integer per color component per pixel. The input (e.g., dual-band image 52) and output (e.g., visible color image 56) images can contain the same number of pixels in the same height to width ratio. The output (e.g., visible color image 56) can also be reformatted to meet the requirements of a particular display.

Figure 3:
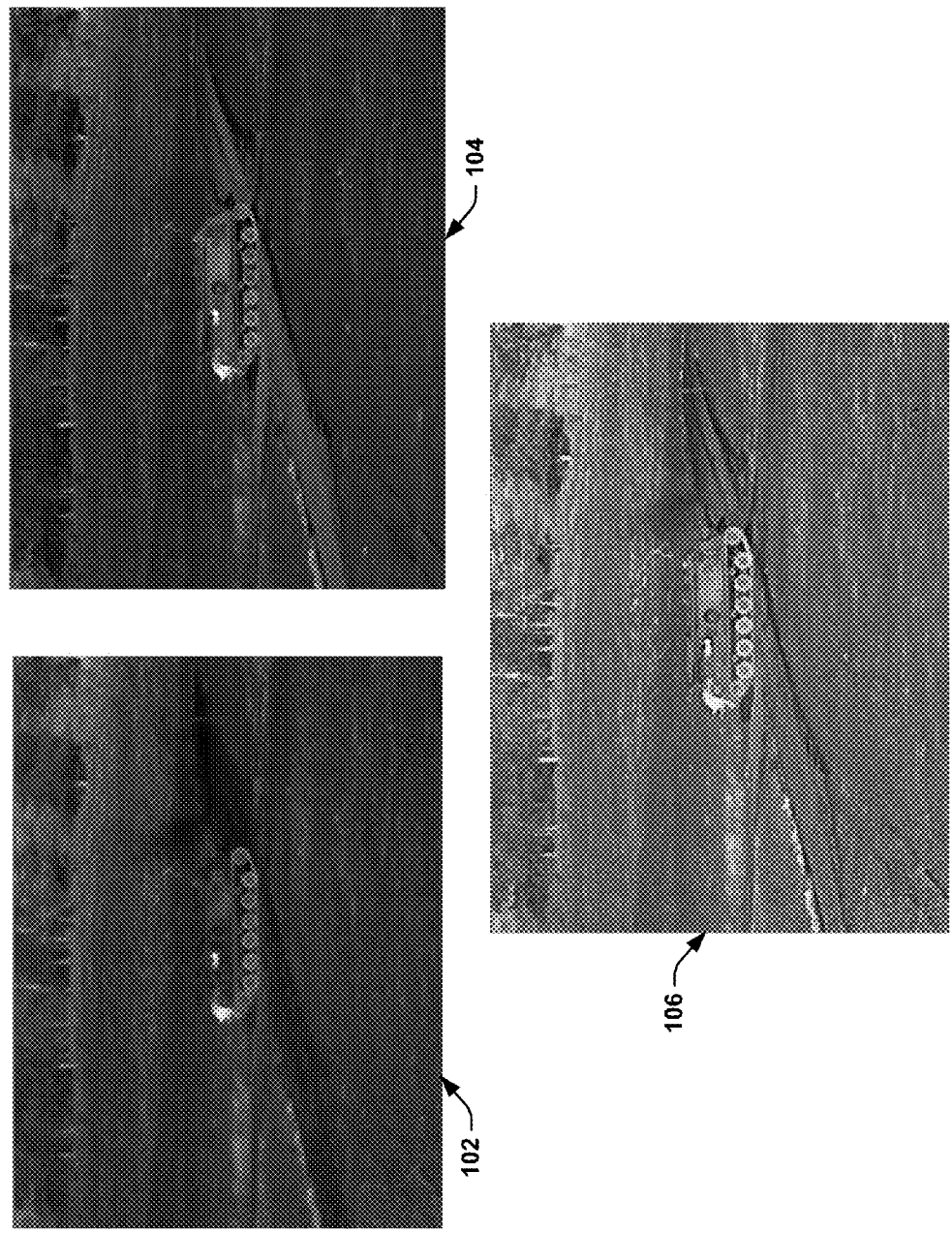
FIG. 3 illustrates an example of a visible color image that can be created from a dual-band infrared image from a FLIR sensor.

An example of the conversion of an LW image 102 and an MW image 104 from a dual-band FLIR sensor to a visible color image 106 is shown in FIG. 3. The processor converts the LW image 102 and the MW image 104 to the placeholder image in the placeholder {L*, a*, b*} color space based on wavelet-based image fusion and an oppositional color processing technique used by the human visual system. The processor 10 then maps the placeholder image to visible {R, G, B} color space to generate the visible color image 106. As evident in FIG. 3, the visible color image 106 contains more depth and contrast than either the LW image 102 or the MW image 104.

Figure 4:
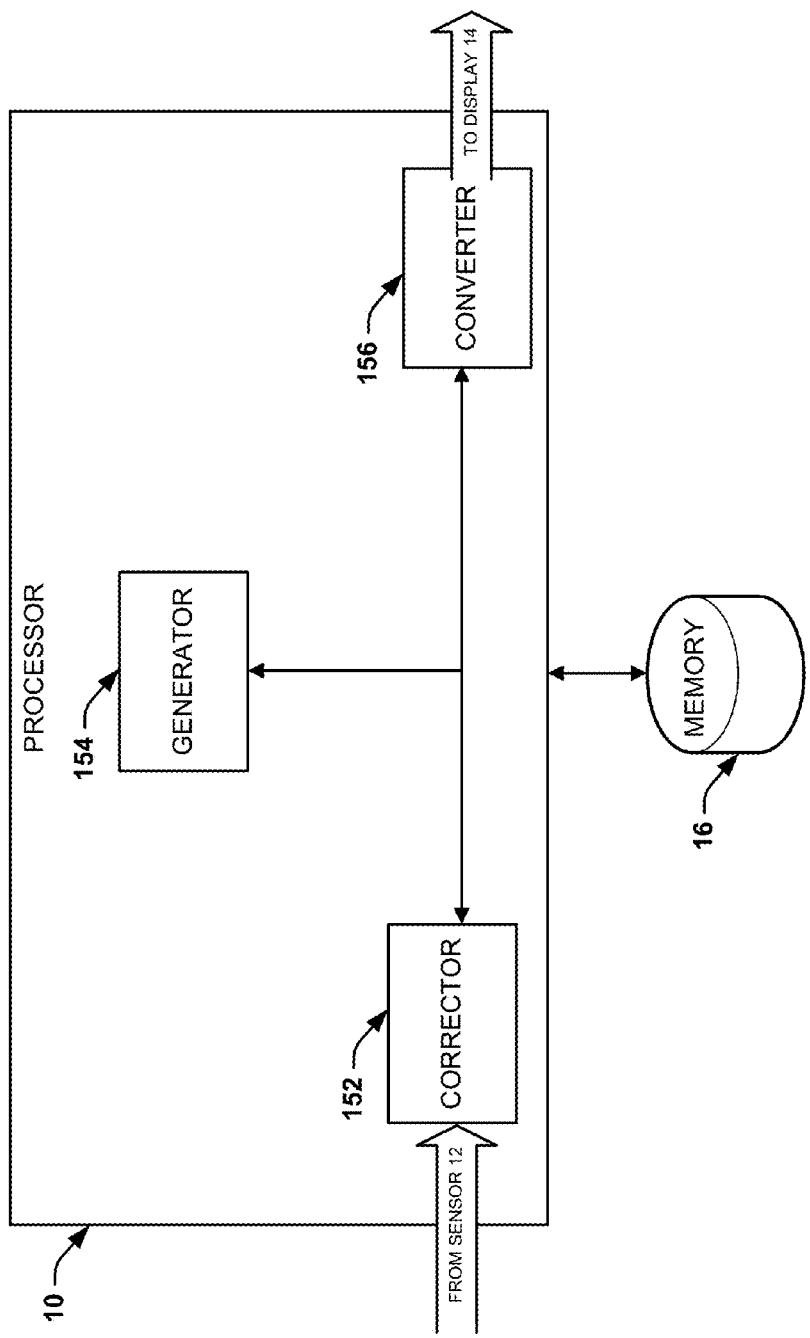
FIG. 4 illustrates an example of a system that can be employed by a processor to convert a dual-band image to a visible color image.

Referring now to FIG. 4, illustrated is a system that can be executed by the processor 10 to facilitate the conversion of a dual-band image recorded by a dual-band sensor 12 to a visible color image that can be displayed by a display device 14. Instructions that facilitate the operation of the system can be stored in the memory 16 that is coupled to the processor. As shown in FIG. 4, the system includes at least a corrector 152, a generator 154, and a converter 156.

The corrector 152 receives image data representing the dual-band image from the sensor 12. The image data includes data captured in the first band and data captured in the second band of the dual-band sensor 12. The data captured in the first band and/or data captured in the second band of the dual-band sensor 12 can include anomalies, e.g., abnormally bright pixels or abnormally dark pixels. The corrector 152 can eliminate these anomalies via standardization of the dynamic range of the data captured in the first band and/or the data captured in the second band of the dual-band sensor 12. To eliminate the anomalies, the corrector 152 can standardize the dynamic range of data captured in the first band and data captured in the second band of the dual-band sensor 12.

During the standardization, the corrector 152 checks the data captured in the first band and/or the data captured in the second band of the dual-band sensor 12 for anomalies. For example, the corrector 152 can check the data by examining the histograms of brightness levels related to the data. Assuming that higher gray levels correspond to hotter areas in the scene, certain anomalies often have a much higher gray level than the rest of the data within the band, which is represented as a gap in the right tail of the histogram. These types of anomalies correspond to either the highly non-Gaussian nature of some infrared images or occasionally to uncorrected image errors. The corrector 152 detects the gap and/or the anomalies in the right tail of the histogram and flags the data as an anomaly for standardization.

When the corrector 152 detects an anomaly, one way the anomaly can be corrected is through a Lin/Log transformation. An example of the Lin/Log transformation is represented mathematically in Equation 1:

$$Y = \begin{Bmatrix} X, \text{ if } X \leq X_0 \\ X + \log(X - X_o), \text{ if } X > X_0 \end{Bmatrix}, \quad \text{(Eq. 1)}$$

where X is the input gray level, $X_0$ is X-value of a point chosen to prevent a large portion of the dynamic range of the image from being used for just a small portion of the image, and Y is the output gray level.

Figure 5:
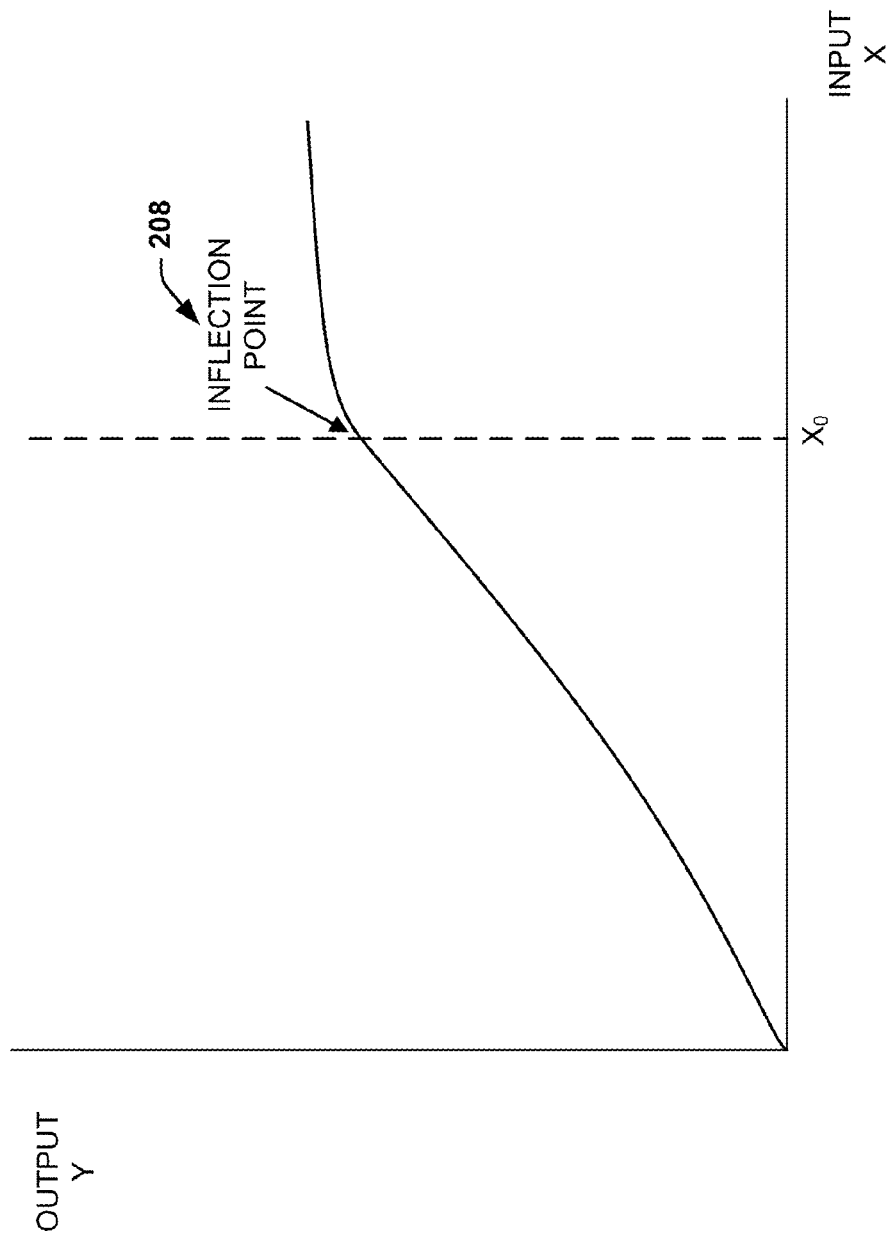
FIG. 5 illustrates an example of a plot that can be employed in the standardization of the dynamic range of the dual-band image.

An example of a plot that can be used for selection of the $X_0$ value in the Lin/Log transform is shown in FIG. 5, where X is the input gray level and Y is the output gray level. The inflection point 208 can be chosen to prevent a large portion of the dynamic range of an image from being used for just a small section of the image. The X-value of the inflection point 208 can be used as the $X_0$ value. The inflection point 208 can be chosen based on factors including, but not limited to: a number of standard deviations above the image mean, a limitation of the number of pixels subject to the transform, a start of a gap at the right tail of a histogram of grayscale values, or another feature that indicates an anomaly.

Additionally or alternatively, the corrector 152 can reduce noise or non-uniformity within the dual-band image. The system can operate without the corrector 152 reducing the noise in the dual-band image, but the system can produce a better visible color image when the dual-band image exhibits low noise. The noise that can be reduced in the dual-band image by corrector 152 can include: random spatial-temporal noise, temporal row noise, temporal column noise, random spatial noise, fixed row noise, fixed column noise, frame-to-frame noise, image brightness flicker, thermal vignetting, periodic noise within an image, and the like. Corrector 152 can employ standard statistical signal processing or image processing techniques to reduce the different types of noise and/or non-uniformity. Some of the noise types can also be corrected within the dual-band sensor 12. For example, the dual-band sensor 12 can employ a thermal reference correction or a scene-based non-uniformity correction to correct for at least a portion of the noise within the dual-band image.

Referring back to FIG. 4, the generator 154 can generate the placeholder image within the placeholder {L*, a*, b*} three-dimensional color space. The generator 154 can generate the L* component of the placeholder image by fusing each dimension of the dual-band image according to a wavelet-based approach. The generator 154 can generate the a* component and the b* component according to strategies inspired by the human visual system. The generator 154 can further expand the dynamic range of the a* component and/or the b* component to reduce the redundancy between the images corresponding to each of the two bands of the dual-band image.

The generator 154 can generate the a* component and the b* component according to strategies inspired by the human visual system. The retina of the human visual system includes rods, which generally perceive a grayscale image, and cones, which generally perceive a color image. The cones can perceive the red band, the green band, and the blue band of the visible portion of the electromagnetic spectrum. The response of the cones to the red band and the green band is highly overlapping, yet humans perceive red and green as distinct colors due to conversion of the incoming image into an opponency space (referred to as oppositional color processing). The placeholder {L*, a*, b*} space used in the conversion of a dual-band image to a visible color image mimics the oppositional color processing of the human visual system. L*, a* and b* are the orthogonal axes of a three-dimensional coordinate system, where L* represents the luminance or brightness axis, a* represents the Red/Green axis, and b* represents the Blue/Yellow axis.

The generator 154 can convert the dual-band image recorded by the dual-band sensor 12 into the three visible color channels (Red, Green, Blue) and then convert the RGB image into the placeholder {L*, a*, b*} space. In the example where the dual-band image {LW, MW} is taken by a FLIR sensor, the generator 154 converts the dual-band {LW, MW} image to a temporary {R, G, B} visible color space as follows in Equation 2:

$$\begin{bmatrix} R = LW \\ G = MW \\ B = LW \times MW \end{bmatrix} \quad \text{(Eq. 2)}$$

The blue channel exhibits a strong response for areas that are simultaneously bright (or at least of a high gray scale value) in both the LW and MW thermal imagery. In an embodiment, the blue channel can be the ratio of the LW and MW pixel values at each pixel location rather than the product of the LW and MW images. In other words, the blue channel is a chosen function of the LW and MW images. The conversion can be done similarly for other types of dual-band images recorded by other types of dual-band sensors.

The generator 154 then converts the temporary {R, G, B} visible color space to the a* and b* components of the placeholder {L*, a*, b*} space. It will be understood by a person having ordinary skill in the art that there are alternative formulations of placeholder color spaces that can be utilized as the placeholder {L*, a*, b*} color space by the generator 154. The formulation of the placeholder {L*, a*, b*} color space as described herein is but one of many possible examples.

In the placeholder {L*, a*, b*} color space, the a* component is a function of R and G. The b* component is a function of B, R and G. An example of calculation of the a* component and the b* component is shown in Equation 3:

$$\begin{bmatrix} a^* = R - G \\ b^* = B - Y \end{bmatrix} \quad \text{(Eq. 3)}$$

where $Y = R + G$.

The generator 154 can expand the dynamic ranges of the a* and b* channels to reduce redundancy between the LW and MW images. As an example, the expansion can be performed by stretching the histogram of a* and b* image values (by an empirically determined fixed amount) about their respective image mean value.

Figure 6:
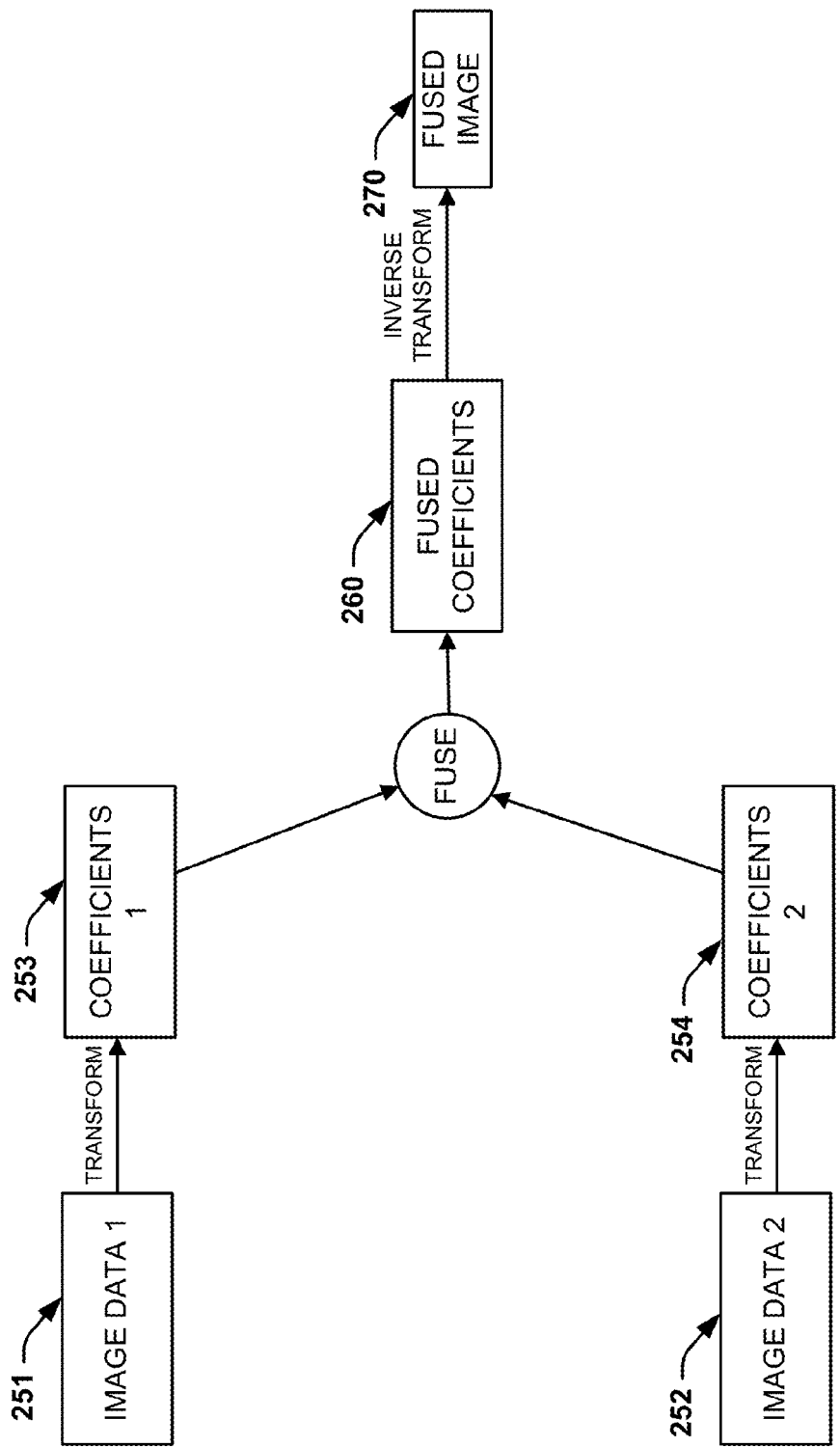
FIG. 6 illustrates an example of a wavelet-based image fusion approach that can be employed in the conversion of the dual-band image data to the placeholder L* space.

The generator 154 can generate the L* component wavelet-based image fusion techniques. An example of a wavelet-based image fusion technique is shown in FIG. 6, where the output of the wavelet-based image fusion technique (e.g., fused image 270) is the L* component. In the fused image 270, high frequency content in the image data from one band of dual-band sensor 12 can be used to strengthen the high frequency content in the image data from the other band of the dual-band sensor 12. In the case where the corrector 152 eliminates noise, the process of FIG. 6 should take place after the noise is eliminated in both bands, or else the noise will be transferred from one band to the other.

The fused image 270 (and thereby the L* component) can emphasize the sharp borders of objects and object components (e.g., military targets) that correspond to abrupt changes in image properties of the dual-band image while de-emphasizing the borders of natural objects (e.g., trees, bushes, grass and the like), which can often reveal important changes in the scene recorded by the dual-band sensor 12. The abrupt changes can include discontinuities in depth, discontinuities in surface orientation, change in material constitution, change in scene illumination, differences in shadowing, or the like.

As illustrated in FIG. 6, image data 251, 252 from the two bands of the dual-band sensor 12 that have undergone any standardization or noise correction by corrector 152 can be received by the generator 154. The generator 154 can perform a domain transformation (transform) on both the image data from the first band (image data 1, e.g., LW data) 251 and image data from the second band (image data 2, e.g., MW data) 252 so that the image data 251, 252 is in a transform domain. The transform can be a multi-scale transform technique, such as: a two-dimensional discrete wavelet transform (DWT) or a dual-tree complex wavelet transform (DT-CWT). Other transform techniques can be used.

One example transform that can be used by the generator 154 is a DWT, which captures the frequency and location properties of the image data 251 and 252. In FIG. 6, two separate transforms are performed. For each channel of the dual-mode image The input signal can be decomposed to the approximation signal $x^{k+1}(n)$ and the detail signal $y^{k+1}(n)$ by filtering with high pass kernels $h_k$ for the approximation signal and $g_k$, for the detail signal, as shown in Equations 4 and 5:

$$x^{k+1}(n) = (h_k * x^k)(2n) \quad \text{(Eq. 4)}$$

$$y^{k+1}(n) = (g_k * x^k)(2n) \quad \text{(Eq. 5)},$$

where $x^k$ is the input signal, $x^{k+1}$ is the approximation signal, $y^{k+1}$ is the detail signal, and $h_k$ and $g_k$ are high pass filter kernels. In a DWT, any signal $x^k(n)$ can be decomposed one level to an approximation signal $x^{k+1}(n)$ and a detail signal $y^{k+1}(n)$.

Another example transform that can be used by the generator 154 is the DT-CWT, which has several advantages compared to the DWT. The advantages relate to increased shift invariance and directional sensitivity. As shown in FIG. 6, two separate transforms are performed. For each image data 251, 252, within the DT-CWT, two pairs of transform images (where a pair includes real and complex images) are computed, where the pixel values are the wavelet coefficients. The first pair is decomposed in scale by using the even terms of the image, while the second pair is decomposed using the odd terms.

After the transformation, the generator 154 can generate sets of coefficients (coefficients 1 and coefficients 2) 253, 254 corresponding to the image data 251, 252. The generator 154 can fuse the sets of coefficients 253, 254 to form a set of fused coefficients 260. The fused coefficients 260 can be used to form the fused image 270 after taking an inverse transform. The inverse transform is the inverse of the transform used to transform the image data 251, 251 to the sets of coefficients 253, 254. The fused image 270 is a grayscale image that captures the luminescence and brightness of the dual-band image recorded by the dual-band sensor 12. Accordingly, the generator 154 uses the fused image 270 as the L* component.

An alternate approach that the generator 154 can use to generate the L* component can be employed when processing resources of processor 10 are limited. In the alternate approach, only a single wavelet frequency is utilized, and frequency is a function of range. The L* value at a pixel in the case where the dual-band sensor 12 is a FLIR sensor is computed according the alternate approach, shown in Equation 6:

$$L^*(i, j) = \frac{1}{2}\Psi_r[LW(i, j)] + \frac{1}{2}\Psi_r[MW(i, j)] + \max\left(\frac{1}{2}\Delta_r[LW(i, j)], \frac{1}{2}\Delta_r[MW(i, j)]\right), \quad \text{(Eq. 6)}$$

where $$\Delta_r[LW(i, j)] = LW(i, j) - \Psi_r[LW(i, j)],$$

$$\Delta_r[MW(i, j)] = MW(i, j) - \Psi_r[MW(i, j)],$$

$\Psi_r = \Psi_{r(R)}$ is a two-dimensional Gaussian blur function of radius r,

R=range in meters, and

LW and MW images are pre-normalized in mean and variance.

The alternate approach generates the L* component without consuming a prohibitive amount of processor resources when the processing resources of processor 10 are low.

The system of FIG. 4 also includes a converter 156 that can convert the placeholder image in the placeholder {L*, a*, b*} color space to the visible {R, G, B} color space to generate the visible color image. This conversion can be accomplished according to Equation 7, where each component of the visual {R, G, B} color space is based on components of the placeholder image:

$$R = L^* + \frac{a^*}{2} + \frac{b^*}{3} \quad \text{(Eq. 7)}$$

$$G = L^* - \frac{a^*}{2} + \frac{b^*}{3}$$

$$B = L^* - \frac{2b^*}{3}$$

The visible color image in the visible {R, G, B} color space can be transmitted to display 14 so that the display 14 can display the visible color image (e.g., to a human user). The data prepared for display 14 can also facilitate processing of the visible color image according to an artificial intelligence routine. The visible color image contains more depth and contrast than images recorded by either of the two bands of the dual-band sensor 12. An example of the superiority of the visible color image compared to the dual-band image is illustrated in FIG. 3. In FIG. 3, to the human observer, the visual color image 106 clearly exhibits more depth and contrast compared to the LW image 102 and the MW image 104.

Referring back to FIG. 4, the converter 156 can perform additional image processing techniques to emphasize certain features within the visible color image. For example, the converter 156 can further permute and/or invert the color channels to change the appearance of the color image (e.g., to emphasize various features of the color image). Similarly, converter 156 can perform a non-linear mapping of the color image to a different color space to change the character of the resulting image to emphasize features of the color image. For example, the permuting, inverting, or mapping to the different color space can create an image with blue sky and green vegetation, one in which military targets appear more prominent than the rest of the image, or one in which obscuring dust appears as a different color than the rest of the image.

Figure 7:
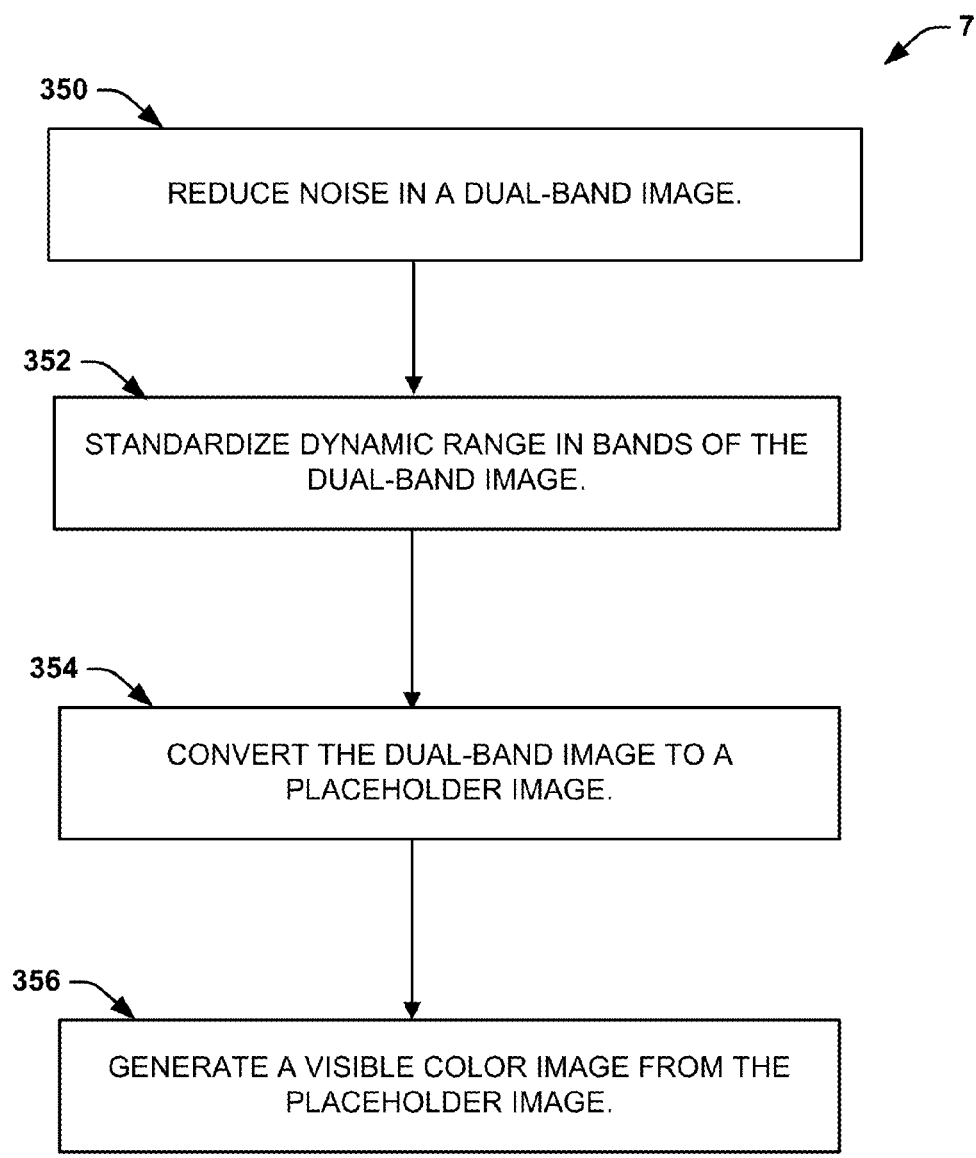
FIG. 7 illustrates an example of a method for converting a dual-band image to a visible color image.

In view of the foregoing structural and functional features described above, a method in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. It will be appreciated that some or all of each of these methods can be implemented as machine-readable instructions on a non-transitory computer readable medium (e.g., memory 16).

FIG. 7 illustrates an example of a method 7 for converting a dual-band image (e.g., the dual-band image 52 from dual-band sensor 12) to a visible color image (e.g., the visible color image 56). At 350, noise is reduced in the dual-band infrared image. At 352, a dynamic range of a first band of the dual-band infrared image (e.g., the LW band) and a dynamic range of a second band of the dual-band infrared image (e.g., the MW band) are standardized (e.g., via the corrector 152). At 354, the dual-band infrared image with reduced noise and standardized dynamic range of the first band and the second band is converted to a placeholder image (e.g., the placeholder image 54) in a placeholder color space (e.g., the placeholder {L* a* b*} color space) based on a wavelet-based image fusion technique and an oppositional color processing technique utilized by the human visual system. At 356, the placeholder image is transformed to a visible color space (e.g., the visible {R, G, B} color space) to create the visible color image (e.g., visible color image 56).

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An apparatus for displaying dual-band image sensor data as a visible color image, comprising:
  a dual-band image sensor;
  a non-transitory memory storing machine-readable instructions to at least:
    fuse different bands of the dual-band image sensor data using wavelet-based image fusion to generate the L* component of an {L*, a*, b* } color space placeholder image;
    generate the a* and b* components of the placeholder image by:
      generating an {R, G, B } visible color space temporary image having red, green, and blue channels, wherein the red channel of the temporary image is created from one band of the dual-band image sensor, the green channel of the temporary image is created from the other band of the dual-band image sensor, and the blue channel of the temporary image is created from either the product of the two bands of the dual-band image sensor or the ratio of the two bands of the dual-band image sensor;

generating the a* component of the placeholder image as a function of the red and green channels of the temporary image; and generating the b* component of the placeholder image as a function of the red, green, and blue channels of the temporary image; and converting the placeholder image to an {R, G, B} visible color space output image having red, green, and blue channels, wherein the red channel of the output image is created as the sum of the L* component and the sum of ½times the a* component and ⅓times the b* component, the green channel of the output image is created as the difference between the L* component and the sum of ½times the a* component and ⅓times the b* component, and the blue channel of the output image is created as the difference between the L* component and ⅔times the b* component; and a processor, operably coupled to the memory and the dual-band image sensor, configured to execute the machine-readable instructions.

2. The apparatus of claim 1, wherein the dual-band image sensor is a dual-band forward-looking infrared sensor or at least two of a long-wave infrared sensor, a mid-wave infrared sensor, a short-wave infrared sensor, a monochrome visible sensor, a near infrared sensor, or an image intensified image sensor.

3. The apparatus of claim 1, wherein:
the image from the dual-band sensor comprises long-wave infrared data and mid-wave infrared data; and
the a* and b* components of the placeholder image are further generated by expanding the dynamic ranges of the a* and b* channels to reduce redundancy between the two bands of the dual-band image sensor, such that data within the placeholder image exhibits a decreased redundancy relative to a pairing of the long-wave infrared data and the mid-wave infrared data.

4. The apparatus of claim 1, wherein:
the image from the dual-band sensor comprises long-wave infrared data and mid-wave infrared data;
the red channel of the temporary image comprises the long-wave infrared data;
the green channel of the temporary image comprises the mid-wave infrared data; and
the blue channel of the temporary image comprises data that represents either the product or the ratio of the long-wave infrared data and the mid-wave infrared data.

5. The apparatus of claim 3, wherein the expansion of the dynamic ranges of the a* and b* channels is performed by stretching the histogram of a* and b* image values about their respective image mean values.

6. The apparatus of claim 1, wherein the L* component of the placeholder image is generated using only a single wavelet frequency.

7. The apparatus of claim 6, wherein the single wavelet frequency is a function of range in units of distance.

8. The apparatus of claim 1, wherein the processor further facilitates the execution of the machine-readable instructions to apply a mean filter, a median filter, a high-pass filter, a low-pass filter, or an unsharp-mask filter to at least one of the image from the dual-band sensor, the placeholder image, or the visible color image.

9. A non-transitory computer-readable storage medium storing instructions executable by an associated processor to perform a method for converting a dual-band image to a visible color image, the method comprising:

fusing different bands of the dual-band image using wavelet-based image fusion to generate the L* component of an {L*, a*, b*} color space placeholder image;

generating the a* and b* components of the placeholder image by:
generating an {R, G, B} visible color space temporary image having red, green, and blue channels, wherein the red channel of the temporary image is created from one band of the dual-band image sensor, the green channel of the temporary image is created from the other band of the dual-band image sensor, and the blue channel of the temporary image is created from either the product of the two bands of the dual-band image sensor or the ratio of the two bands of the dual-band image sensor;

generating the a* component of the placeholder image as a function of the red and green channels of the temporary image; and generating the b* component of the placeholder image as a function of the red, green, and blue channels of the temporary image; and converting the placeholder image to an {R, G, B} visible color space output image having red, green, and blue channels, wherein the red channel of the output image is created as the sum of the L* component and the sum of ½times the a* component and ⅓times the b* component, the green channel of the output image is created as the difference between the L* component and the sum of ½times the a* component and ⅓times the b* component, and the blue channel of the output image is created as the difference between the L* component and ⅔times the b* component; and emphasizing a feature of the output image based on the converting the placeholder image to the output image.

10. The non-transitory computer-readable storage medium of claim 9, wherein the first channel of the dual-band image comprises long-wave infrared data and the second channel of the dual-band image comprises mid-wave infrared data.

11. The non-transitory computer-readable storage medium of claim 10, wherein:
the red channel of the temporary image comprises the long-wave infrared data;
the green channel of the temporary image comprises the mid-wave infrared data; and
the blue channel of the temporary image comprises data that represents either the product or the ratio of the long-wave infrared data and the mid-wave infrared data.

12. The non-transitory computer-readable storage medium of claim 11, wherein the a* and b* components of the placeholder image are further generated by expanding the dynamic ranges of the a* and b* channels to reduce redundancy between the two bands of the dual-band image sensor, such that data within the placeholder image exhibits a decreased redundancy relative to a pairing of the long-wave infrared data and the mid-wave infrared data.

13. The non-transitory computer-readable storage medium of claim 9, wherein the L* component of the placeholder image is generated using only a single wavelet frequency, the frequency being a function of range in units of distance.

14. A non-transitory computer-readable device storing executable instructions executable by an associated processor to perform operations that convert a dual-band infrared image to a visible color image, the operations comprising:
reducing noise in the dual-band infrared image;
standardizing a dynamic range of a first band of the dual-band infrared image and a dynamic range of a second band of the dual-band infrared image;
converting the dual-band infrared image with reduced noise and standardized dynamic range of the first band and the second band to a placeholder image in an {L*, a*, b* } color space by:
fusing the first and second bands using wavelet-based image fusion to generate the L* component of the placeholder image;
generating the a* and b* components of the placeholder image by:
generating an {R, G, B] visible color space temporary image having red, green, and blue channels, wherein the red channel of the temporary image is created from the first band, the green channel of the temporary image is created from the second band, and the blue channel of the temporary image is created from either the product of or the ratio of the first and second bands;
generating the a* component of the placeholder image as a function of the red and green channels of the temporary image; and
generating the b* component of the placeholder image as a function of the red, green, and blue channels of the temporary image; and
converting the placeholder image to an {R, G, B} visible color space output image having red, green, and blue channels, wherein the red channel of the output image is created as the sum of the L* component and the sum of ½times the a* component and ⅓times the b* component, the green channel of the output image is created as the difference between the L* component and the sum of ½times the a* component and ⅓times the b* component, and the blue channel of the output image is created as the difference between the L* component and ⅔times the b* component.

15. The non-transitory computer-readable device of claim 14, wherein the L* component of the placeholder image is generated using only a single wavelet frequency.

16. The non-transitory computer-readable device of claim 15, wherein the single wavelet frequency is a function of range in units of distance.

17. The non-transitory computer-readable device of claim 14, wherein the the first band comprises long-wave infrared data, the second band comprises mid-wave infrared data, the a* component of the placeholder image is generated by subtracting the green channel from the red channel, and the b* component of the placeholder image is generated by subtracting from the blue channel the sum of the red and green channels.

18. The non-transitory computer-readable device of claim 17, wherein the wavelet-based image fusion comprises generating the L* data based on fusing the long-wave infrared data and the short-wave infrared data according to a dual-tree complex wavelet transform process.

19. The non-transitory computer-readable device of claim 18, wherein the dual-tree complex wavelet transform process comprises:
converting the long-wave infrared data and the mid-wave infrared data to a transform domain according to a dual-tree complex wavelet transform process that increases a shift invariance and increases a directional sensitivity in the L* data; and
forming a transform image by selecting coefficients from the transformed long-wave band image and the transformed mid-wave infrared band image.

20. The non-transitory computer-readable device of claim 19, wherein the dual-tree complex wavelet transform process further comprises producing a fused grayscale image by taking an inverse transform of the transform image.

* * * * *